(No Model.)

J. H. FITCH.
BASKET OR CRATE.

No. 576,188. Patented Feb. 2, 1897.

Witnesses:
L. C. Hills.
A. D. Hough

Inventor:
John H. Fitch,
by Franklin H. Hough
Atty.

UNITED STATES PATENT OFFICE.

JOHN H. FITCH, OF WESLEY, MICHIGAN.

BASKET OR CRATE.

SPECIFICATION forming part of Letters Patent No. 576,188, dated February 2, 1897.

Application filed November 3, 1896. Serial No. 610,970. (No model.)

*To all whom it may concern:*

Be it known that I, JOHN H. FITCH, a citizen of the United States, residing at Wesley, in the county of Mason and State of Michigan, have invented certain new and useful Improvements in Baskets or Crates; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to certain new and useful improvements in baskets or crates, and especially to an improvement in this line in which I produce a ventilated crate or basket having a suitable handle which is designed to fold back when it is desired to nest the crates or baskets. I also provide means, as will be hereinafter described in detail, by which the handle may be held open or in a position by which the crate may be readily handled and carried about.

Another feature of my improved crate or basket resides in the provision of lugs on opposite sides of the crate or basket, which serve as stops or guides for the slotted handle of the crate, which handle is held up by means of a spring-actuated plate having an inclined side, and over which the handle passes as the handle is raised from its folded position.

To these ends and to such others as the invention may pertain, the same consists, further, in the novel construction, combination, and adaptation of the parts, as will be hereinafter more fully described and then specifically defined in the appended claims.

I clearly illustrate my invention in the accompanying drawings, which, with the letters of reference marked thereon, form a part of this specification, and in which drawings—

Figure 1:
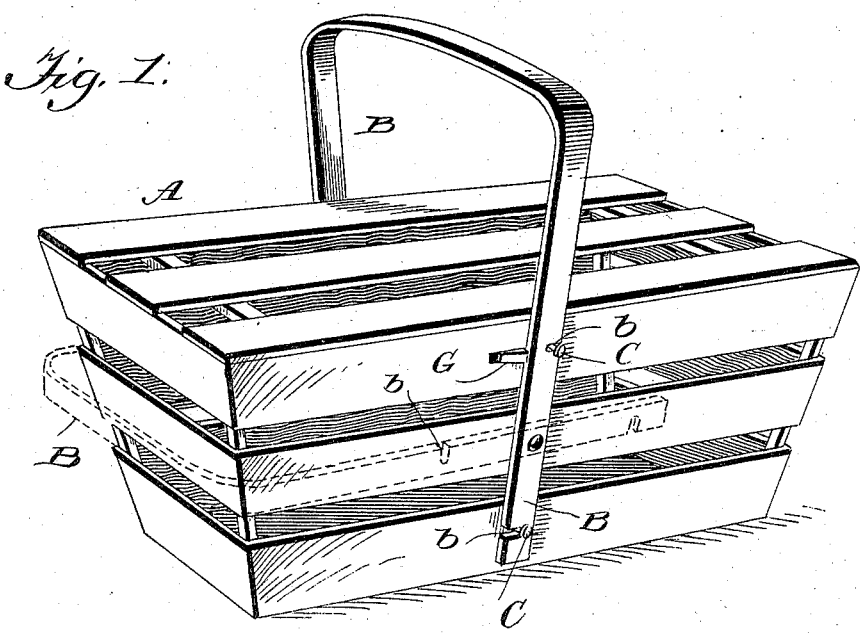
Figure 2:
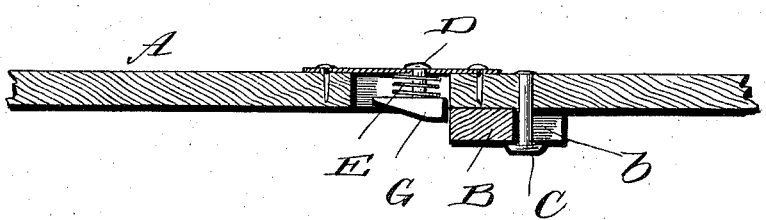

Figure 1 is a perspective view of a crate or basket constructed in accordance with my invention, showing the handle in full lines as locked open and the handle closed by dotted lines. Fig. 2 is a sectional view showing the spring-actuated locking-plate.

Reference now being had to the details of the drawings by letter, A designates the crate or basket, which is made, preferably, out of strips of wood, and in such a manner and shape as to allow the fruit that may be contained therein to show clearly from all sides by leaving sufficient space between the slats, which arrangement will also allow of better ventilation to the fruit.

Pivoted to the sides of the crate or basket, on opposite sides, is the handle B, which has on opposite edges, near each pivoted end, slots $b\ b$, which receive the lugs C C when the handle is open or in the position shown in dotted lines in Fig. 1. When it is desired to arrange the baskets so that they will nest, the handle is turned down in the position shown in dotted lines, Fig. 1.

Mounted in recesses on opposite sides of the crate or basket, on any of the strips thereof, or only on one side, if preferable, is the spring-actuated plate or plates, as the case may be. A pin D carries thereon a coiled spring E, to one end of which spring is attached the plate F, having an inclined edge G, with its inclination from its inner end outward, as seen in Fig. 2, so as to allow the handle to pass over the same as it is opened, the plate being depressed in the recess as the handle passes over it, and after the handle has passed the said plate the latter will spring out and hold the handle in an open or erect position. When it is desired to close the handle, the spring-plate is depressed and the handle is allowed to fold down, as will be readily understood.

Having thus described my invention, what I claim to be new, and desire to secure by Letters Patent, is—

1. A crate or basket having a pivoted handle thereon provided with slots on opposite sides thereof, lugs on the sides of the basket adapted to engage in said slots, and means for holding the handle open, substantially as shown and described.

2. A crate or basket, having in combination therewith, a pivoted handle with slots in the edges thereof, lugs designed to engage in said slots, and a spring-actuated plate provided to hold the handle open, substantially as shown and described.

3. In combination with a basket or crate, a handle pivoted as described, a spring-actuated plate having an inclined edge, and mounted in a recess and in the path of the folding handle, whereby the said handle is allowed to pass over the spring-actuated plate, when opened up, but prevented from closing until the plate is caused to be depressed, substantially as and for the purpose set forth.

In testimony whereof I affix my signature in presence of two witnesses.

JOHN H. FITCH.

Witnesses:
    ISAIAH DAVIS,
    MOSES H. TAYLOR.